F. W. ZINKIEWIEZ.
FISHING ROD.
APPLICATION FILED MAY 10, 1916.
1,255,269.
Patented Feb. 5, 1918.
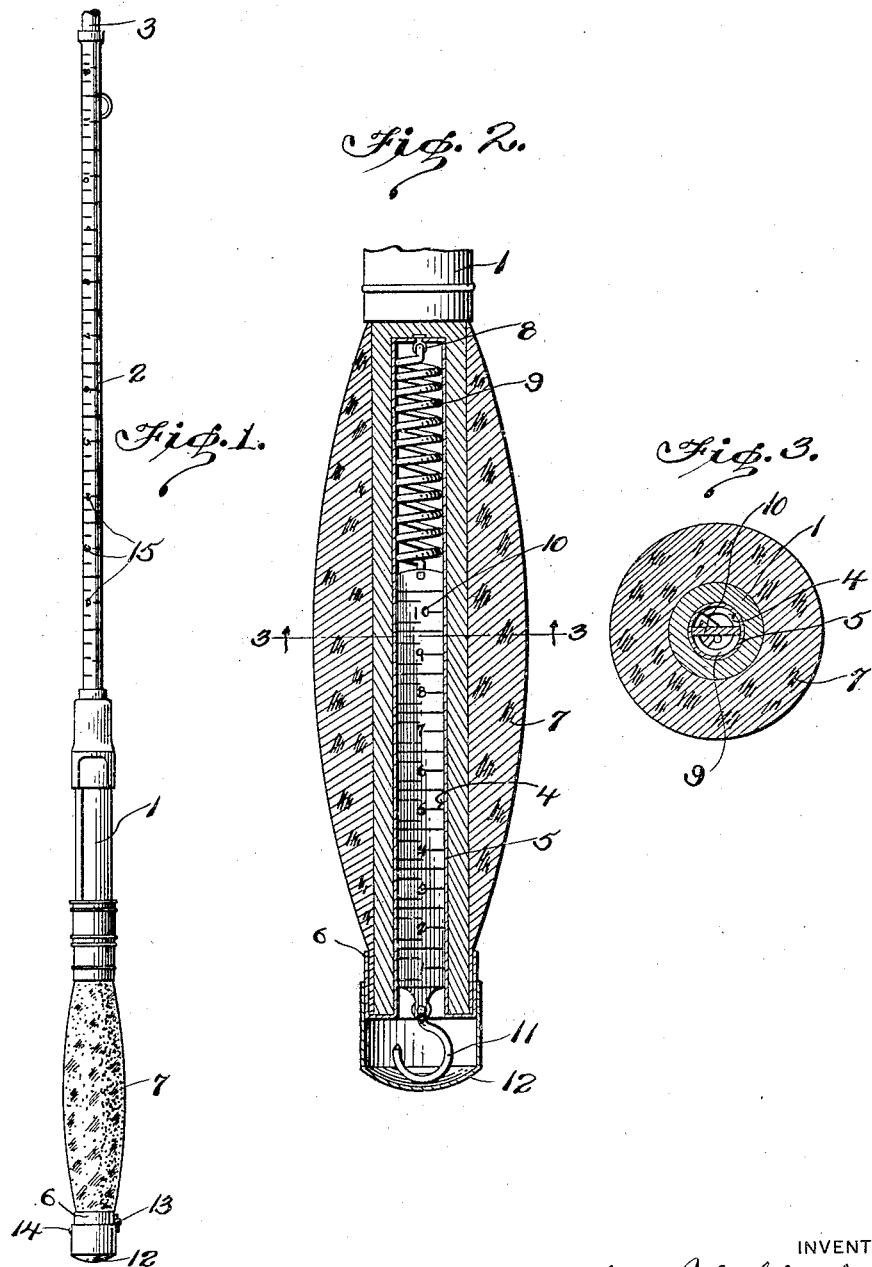
WITNESSES
Howard Costello
Wm. Webster Downing
INVENTOR
Frank W. Zinkiewiez
BY Richard B. Owen
ATTORNEY

UNITED STATES PATENT OFFICE.

FRANK W. ZINKIEWIEZ, OF WORCESTER, MASSACHUSETTS.

FISHING-ROD.

1,255,269.  Specification of Letters Patent.  Patented Feb. 5, 1918.

Application filed May 10, 1916. Serial No. 96,669.

*To all whom it may concern:*

Be it known that I, FRANK W. ZINKIEWIEZ, a citizen of the United States, residing at Worcester, in the county of Worcester and State of Massachusetts, have invented certain new and useful Improvements in Fishing-Rods, of which the following is a specification.

My invention relates to a combination fishing rod and scale, and as the primary object, contemplates the provision of a fishing rod in which the handle is constructed to receive a novel scale adapted to be used by the fisherman after making a catch so as to accurately determine the weight thereof.

It is also contemplated by this invention to provide the section of the rod adjacent the handle with graduations for enabling the fisherman to determine the size of fish after catching them.

Other improvements and novel details of the construction and arrangement of parts will be appreciated from the detailed description below, which is to be read in connection with the accompanying drawings and with the claims forming a part of this specification.

In the drawings:

Figure 1 is an elevation of my invention.

Fig. 2 is an enlarged vertical section of the handle thereof.

Fig. 3 is a transverse section taken on the line 3—3 of Fig. 2 in the direction in which the arrow points.

Referring more particularly to the drawings in which similar reference numerals designate like and corresponding parts throughout the different views, I have provided a fishing rod composed of a plurality of sections 1, 2, and 3. The section 1 is provided with a longitudinally inwardly extending chamber 4 in which is mounted a cylindrical metallic shell 5 which conforms substantially to the inner surface of the chamber 4. The outer end of this shell is bent to provide an annular flange 6 which engages the rod 1 and which retains a sleeve handle section 7, formed desirably of cork, about the section of the rod 1 which provides a handle. Preparatory to the insertion of the cylindrical shell an eye 8 is riveted to the inner end of the shell and to this eye is connected one end of the resilient means, in the present instance a coil spring 9. A graduated bar 10 is connected to the free end of the spring and is normally adapted to lie within the shell while a hook 11 is pivoted to the outer end of the bar and normally associated exteriorly of the shell. As is apparent this graduated bar and spring provide a scale and after fish is caught it can be engaged on the hook 11, the weight thereof drawing the bar from the shell, the outer edge shell serving to indicate the weight of the fish. To properly incase this scale a cap 12 is hinged as at 13 to the flange 6 being removably held in position by the catch means 14.

It will be appreciated that any number of sections such as indicated by 2 and 3 may be associated with the section 1 and in order that the fish may be properly measured after being caught I desire to provide the section 2, which is removably connected to the rod 1 with graduations 15.

In use the fishing rod may be operated in the usual manner but after a catch has been made and it desired to weight the same, the cap 12 is placed in an open position and the fish attached to the hook 11. The weight of the fish will act against the tension of the spring to cause the graduated bar 10 to slide outwardly from the shell, the outer edge of the shell coöperating with the said graduated bar to indicate the weight of the fish. In this manner one or more fish can be conveniently weighed and it is thought the use of the graduated section 2 of the rod is apparent.

Although I have shown and described the preferred embodiment of my invention, I desire it to be understood that I am not to be limited to the exact details shown, however, I desire that great stress be laid upon the arrangement of the scale which is peculiarly constructed so as to be readily and conveniently mounted on the handle of the rod. Great stress is also laid on the graduated section rod.

From the above description taken in connection with the accompanying drawing, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:

1. A fishing rod handle, comprising a rod having a longitudinal bore in one end thereof and having a handle sleeve mounted thereabout, a metallic shell snugly fitted in said bore and co-extensive therewith, the outer end of the shell being laterally extended about the outer edge of said rod and into engagement with said sleeve to form a retaining flange for the latter, an expansion spring disposed in the shell and having one end secured to the inner end thereof, a graduated bar disposed in the shell and having its inner end connected to the free end of the spring and carrying a hook on its outer end.

2. A fishing rod handle, comprising a rod having a longitudinal bore in one end thereof and having a handle sleeve mounted thereabout, a metallic shell snugly fitted in said bore and co-extensive therewith, an expansion spring disposed in the shell and having one end secured to the inner end thereof, a graduated bar disposed in the shell to slidably engage with the walls thereof, the graduations on the bar adapted to coöperate with the outer edge of the rod, said bar having its inner end connected with the free end of the spring and having a hook member on its outer end.

In testimony whereof I affix my signature in presence of two witnesses.

FRANK W. ZINKIEWIEZ.

Witnesses:
ALFRED A. STONE,
WILLIAM ZINKIEWIEZ.

Copies of this patent may be obtained for five cents each, by addressing the "Commissioner of Patents Washington, D. C."